Figure 1:
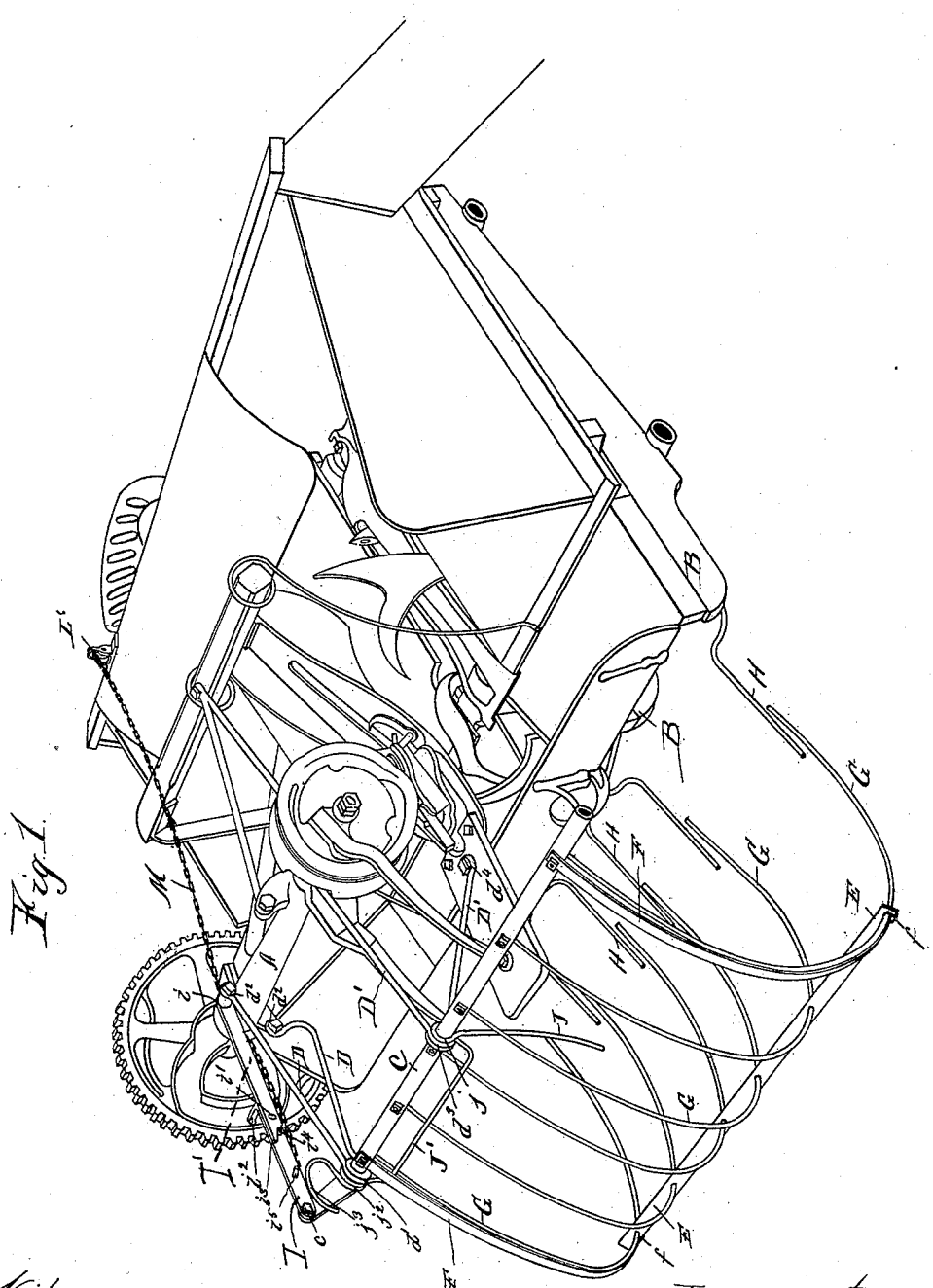

(No Model.) 3 Sheets—Sheet 1.

M. KANE.
SHEAF CARRIER.

No. 415,785. Patented Nov. 26, 1889.

Witnesses:
Sew. E. Curtis.
J. H. Brown.

Inventor:
Maurice Kane,
by A. P. Smith
his Atty.

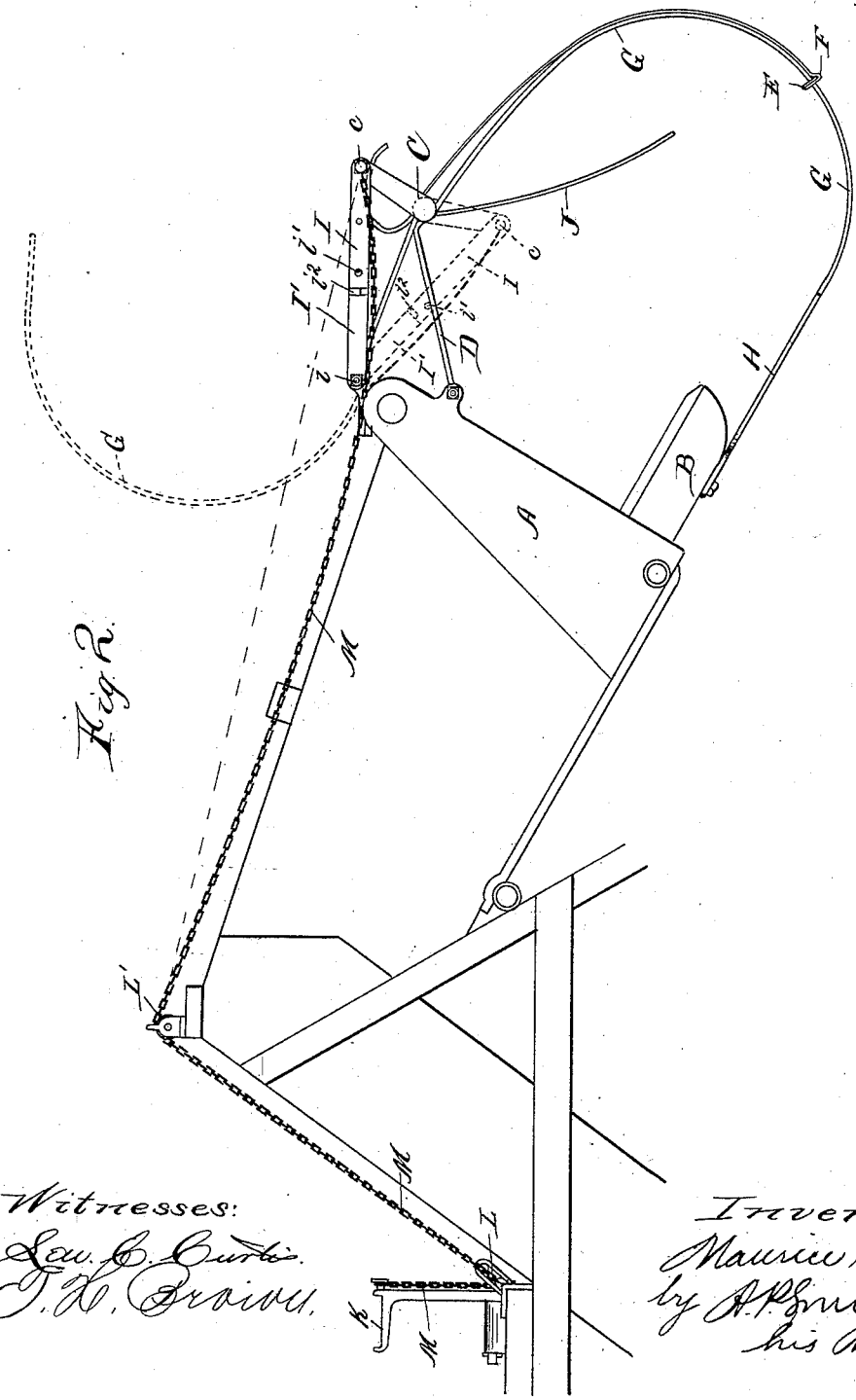

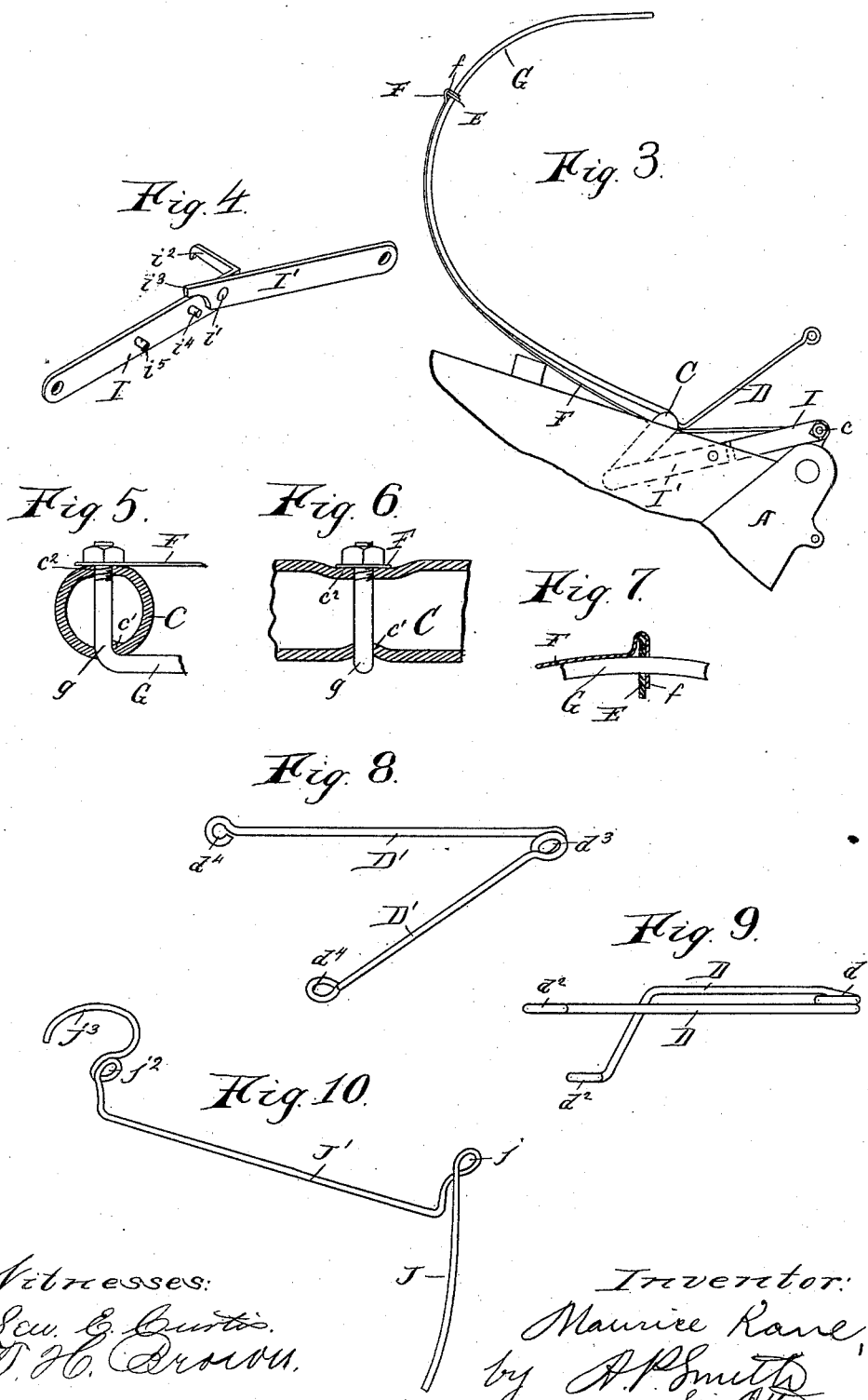

UNITED STATES PATENT OFFICE.

MAURICE KANE, OF CHICAGO, ILLINOIS, ASSIGNOR TO THE WARDER, BUSHNELL & GLESSNER COMPANY, OF SPRINGFIELD, OHIO.

SHEAF-CARRIER.

SPECIFICATION forming part of Letters Patent No. 415,785, dated November 26, 1889.

Application filed July 2, 1889. Serial No. 316,317. (No model.)

*To all whom it may concern:*

Be it known that I, MAURICE KANE, a citizen of the United States, residing at Chicago, in the county of Cook and State of Illinois, have invented certain new and useful Improvements in Sheaf-Carriers; and I do hereby declare the following to be a full, clear, and exact description of the invention, such as will enable others skilled in the art to which it appertains to make and use the same.

My invention consists in an improved sheaf-carrier for harvesters, hereinafter to be described and claimed.

In the drawings, Figure 1 is a perspective view of the binder table and frame of a harvester with my sheaf-carrier attached. Fig. 2 is a back end view of the same. Fig. 3 is a detailed view showing the sheaf-carrier thrown back in order to enable the machine to pass through a gate or to enable the operator to get at the binding mechanism. Fig. 4 is a detail of the knee-joint for operating the sheaf-carrier. Figs. 5 and 6 are detailed views of the method of attaching the fingers to the main shaft of the sheaf-carrier. Fig. 7 is a detailed view showing the arrangement of the stay-bar and supporting-strip. Figs. 8 and 9 are detailed views of the supporting-brackets. Fig. 10 is a detailed view of the trip-arm and trip-finger for automatically operating the sheaf-carrier.

A represents the binder-frame placed on the binder-table, which is supported by the cross-pieces B in the usual way.

C is the main shaft of the sheaf-carrier, which is supported in bearings $d'$ and $d^3$ of the brackets D and D', which are attached to the binder-frame by bolts passing through the eyes $d^2$ and $d^4$.

A row of lower fingers H, which are nearly straight, are attached to the binder-table or to the beams B, a corresponding set of curved depending fingers G are attached to the main shaft C and supported by the stay-bar E, which is in turn kept in place by one or more supporting-strips F, as clearly shown in Figs. 1 and 2.

The supporting-shaft C has a crank-arm $c$, to which is pivoted a link I. Another link I' is pivoted to the binder-frame at the point $i$. These two links are pivoted together by the pin $i'$. The link I' has a projection $i^3$, which, when the two links have fallen slighty below the straight line joining the points $c$ and $i$, bears against the pin $i^4$, set in the link I. Thus the two links I and I' form a knee-joint. This knee-joint can be broken in two ways, either by pulling on the chain M, which is attached to the crank $c$ and passes under the projection $i^2$ of the link I, and then over pulleys L' and L to the treadle K, or by the lifting of the link I by the curved trip-arm $j^3$, bearing against the pin $i^5$, set in the link I. The curved trip-arm $j^3$ is mounted on the shaft C by the bearing $j^2$, as is best shown in Figs. 1 and 10. It is connected by the portion J' with the trip-finger J, which is also mounted on the rotating shaft C by the bearing $j$.

The manner in which the fingers G and the supporting-strips F are attached to the main shaft C is best shown in Figs. 5 and 6. The ends or heads of the fingers G are bent at right angles, as shown at $g$. These bent portions are passed through the openings $c'$ and $c^2$, bored in the main shaft C, and the perforated end of the supporting-strip F is also put over the threaded head of the finger, and the nut then being screwed down holds all the parts fast.

The manner in which the stay-bar E is supported is shown in Fig. 7. The lower end of each supporting-strip F is bent into a hooked form having a straight portion $f$. This portion is perforated and the finger G passes through the stay-bar E, and also through the perforation in the portion $f$ in the hooked end of the supporting-strip F.

When desired, in order to enable the machine to pass through a gate, or to enable the operator to get at the binding mechanism, the whole sheaf-carrier may be turned back on its uppermost bearings $d^2$ and $d^4$ by releasing the attachment at the lower bearings $d^2$ and $d^4$, as is clearly shown in Fig. 3.

The method of operation of my improved sheaf-carrier is the following: When in their lowest position of adjustment, the ends of the fingers G lie alongside of and parallel to the ends of the lower fingers H, and thereby a large portion of the weight of the bundles within the sheaf-carrier is supported on these short fingers H, and the curved depending fingers G are thereby kept from sagging. This interlocking of the upper and lower set of fingers, whereby they lie alongside of and parallel to one another for a considerable portion of their length, is of combined advantage, inasmuch as it enables each set of teeth to afford support to the other and presents a re-enforcing action and mutual support at what is in the ordinary form of sheaf-carrier the weakest point, and where there is the greatest accumulation of weight. When in the ordinary form of sheaf-carrier the two sets of teeth simply meet, the accumulated weight of the bundles, which is heaviest at that point, acts upon the entire length of the teeth as a leverage and tends to bend them backward and apart. In my construction this, together with the possibility of a bundle getting in between the two sets of teeth as the sheaf-carrier is closed, is avoided by this interlocking of the upper and lower sets of teeth in the manner described. When it is desired to trip the sheaf-carrier, the operator may lift the links I and I' by hand, if he can reach them, thereby breaking the knee-joint, which, when down, locks the sheaf-carrier in its lowest position of adjustment, and positively rotating the shaft C, and thereby opening the carrier and dumping its contents. The same thing may be accomplished by pulling on the chain M, which is attached to the crank $c$, and which, when pulled taut, as shown by the dotted lines in Fig. 2, will engage the projection $i^2$, and thus break the knee-joint and by continued tension pull the crank $e$ around and throw the curved fingers G into the position shown in the dotted lines in said Fig. 2. The chain M may be conveniently operated by hand, or it may be attached to a suitable treadle K.

The sheaf-carrier will be automatically tripped when a certain number of bundles have accumulated in it by the pressure of said bundles on the trip-finger J, which extends into the interior of the sheaf-carrier, and which will be driven backward, and thereby caused to transmit motion to the curved trip-arm $j^3$. This will engage with the projection $i^5$ of the link I and break the knee-joint in the manner before described.

The advantages of having a sheaf-carrier which can be positively operated by hand or foot and will at the same time be automatic in its operation and simple in construction are obvious. The advantages of the constructions shown in Figs. 5, 6, 7, 8, and 9 are evident, also, from the simplicity of design, the small number and compact arrangement of the parts, and the manner in which one nut is made to hold a large number of parts together.

I prefer to make the supporting main shaft C hollow, as shown, for lightness and strength, and also for the more secure attachment of the teeth G when arranged in the manner described.

Having described my invention, what I claim as new, and desire to protect by Letters Patent, is—

1. The combination of the lower fingers secured to the binder-table and the curved depending fingers, the ends of which, when in their lowest position of adjustment, lie alongside and parallel to the lower fingers, together with the rotating main shaft, to which the depending fingers are attached, substantially as described.

2. The combination of the curved depending fingers, the main shaft to which they are attached, the stay-bar for the fingers, one or more supporting-strips for the stay-bar, which said strips are attached to main shaft and lie adjacent and parallel to certain of the curved depending fingers for a considerable portion of length of said fingers, substantially as described.

3. The combination of the binder-frame, the main shaft journaled in bearings supported thereon, the lower fingers attached to the binder-frame, the curved depending fingers attached to the main shaft, which lie adjacent and parallel to certain of the lower fingers for a considerable portion of their length, the crank on said shaft, and the two links, one of which is pivoted on said crank, while the other is pivoted on the binder-frame, the two links being also pivoted together, and thereby forming a knee-joint, substantially as described.

4. The combination of the binder-frame, the main shaft journaled in bearings supported thereon, the curved depending fingers attached to the main shaft, the crank on said shaft, and the two links, one of which is pivoted on and positively connected to said crank, while the other is pivoted on and positively connected to the binder-frame, the two links being also pivoted together, and thereby forming a knee-joint, together with a projection on one of said links, and a chain which on being tightened engages said projection and breaks the knee-joint, substantially as described.

5. The combination of the binder-frame, the main shaft journaled in bearings supported thereon, the curved depending fingers attached to the main shaft, the crank on said shaft, and the two links, one of which is pivoted on said crank, while the other is pivoted on the binder-frame, the two links being also pivoted together, and thereby forming a knee-joint, together with a projection on one of said links and a chain which is attached to the crank and which engages with the said projection when tightened, thereby first breaking the knee-joint and afterward positively opening the sheaf-carrier, substantially as described.

6. The combination of the binder-frame, the rotating main shaft supported in bearings on the binder-frame, the crank, the links which form a knee-joint between the crank and the binder-frame, a curved trip-arm mounted on the main shaft and engaging with one of the links, the trip-finger, also mounted on the main shaft and extending into the interior of the sheaf-carrier, and a suitable connecting mechanism between the trip-finger and the curved trip-arm, by which the motion of one is transmitted to the other, substantially as described.

7. The combination of a curved depending finger, a stay-bar through which it passes, and the supporting-strip which terminates in a hook which partly surrounds the stay-bar, the end of which hook is also perforated for the passage of the finger, substantially as described.

8. The combination of the hollow main shaft perforated for the admission of the head of the finger, which has its head bent at right angles, with a thread cut thereon, the curved depending finger, and the nut for holding the head of the finger in place, together with a stay-bar through which the finger passes, and the supporting-strip, one end of which slips over the head of the finger and is held between the main shaft and the nut, while the other end terminates in a hook which partly surrounds the stay-bar, the end of which hook is also perforated for the passage of the finger, substantially as described.

In testimony whereof I affix my signature in presence of two witnesses.

MAURICE KANE.

Witnesses:
R. C. HASKINS,
A. V. STEWART.